United States Patent
Augustine et al.

(10) Patent No.: US 10,068,476 B2
(45) Date of Patent: Sep. 4, 2018

(54) VEHICLE LOCATION DISCREPANCY DETECTION AND MITIGATION

(71) Applicant: International Business Machines Corporation, Armonk, NY (US)

(72) Inventors: Chanelle S. Augustine, Toronto (CA); Steven Y. Jin, Markham (CA); Jin Li, Markham (CA); Chuyue Zhang, Markham (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/358,929

(22) Filed: Nov. 22, 2016

(65) Prior Publication Data

US 2018/0144630 A1    May 24, 2018

(51) Int. Cl.
G08G 1/123    (2006.01)
G08G 1/127    (2006.01)

(52) U.S. Cl.
CPC .................................... *G08G 1/127* (2013.01)

(58) Field of Classification Search
None
See application file for complete search history.

(56) References Cited

U.S. PATENT DOCUMENTS 6,246,956 B1 * 6/2001 Miyoshi .................. B61L 23/16
246/182 R
8,742,954 B2    6/2014 Chavez et al.
2014/0156410 A1    6/2014 Wuersch et al.
2014/0164118 A1    6/2014 Polachi
2015/0178806 A1    6/2015 Salonen
2015/0210294 A1 * 7/2015 Nemeth .................. B61B 13/00
701/19
2015/0230054 A1    8/2015 Myllymaki et al.

FOREIGN PATENT DOCUMENTS

WO    WO2015042650 A1    4/2015
WO    WO2015089116 A1    6/2015

OTHER PUBLICATIONS

"Best Family Locators, Reviewed", FarnilyLocator.info, http://familylocator.info/, retrieved from the Internet Sep. 8, 2016, 3 pages.
"How Do I Locate the Car I Booked?", Getaround, https://help.getaround.com/hc/en-us/articles/204371314-How-do-I-locate-the-car-I-booked-, retrieved from the Internet Sep. 8, 2016, 2 pages.

* cited by examiner

*Primary Examiner* — Julie Lieu
(74) *Attorney, Agent, or Firm* — Francis Lammes; Stephen J. Walder, Jr.; Anthony England (57) ABSTRACT

A mechanism is provided for detecting and mitigating vehicle location discrepancies. A set of dynamic boundaries are generated around a prescribed pickup location agreed upon with a next renter of a vehicle for a prescribed pickup time. A location of the vehicle is also determined. Based on the location of the vehicle, a determination is made of a boundary in the set of dynamic boundaries with which the vehicle is associated. One state from a set of states is identified based on the location of the vehicle and the identified boundary with which the vehicle is located. Based on the identified state, an associated action is performed.

17 Claims, 7 Drawing Sheets

VEHICLE LOCATION DISCREPANCY DETECTION AND MITIGATION

BACKGROUND

The present application relates generally to an improved data processing apparatus and method and more specifically to mechanisms for detecting and mitigating vehicle location discrepancies.

Carsharing, car sharing (United States), or car clubs (United Kingdom) are all terms referring to a model of car rental where people rent vehicles for short periods of time, often by the hour. These car rental models are attractive to customers who make only occasional use of a vehicle, as well as others who would like occasional access to a vehicle of a different type than they use day-to-day. Car rentals may be from a commercial business, users may be organized as a company, a public agency, a cooperative, or an ad hoc grouping.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for detecting and mitigating vehicle location discrepancies. The illustrative embodiment generates a set of dynamic boundaries around a prescribed pickup location agreed upon with a next renter of a vehicle for a prescribed pickup time. The illustrative embodiment determines a location of the vehicle. The illustrative embodiment determines a boundary in the set of dynamic boundaries with which the vehicle is associated based on the location of the vehicle. The illustrative embodiment identifies one state from a set of states based on the location of the vehicle and the identified boundary with which the vehicle is located. The illustrative embodiment performs an associated action based on the identified state.

In other illustrative embodiments, a computer program product comprising a computer usable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide mechanisms for detecting and mitigating vehicle location discrepancies. As noted above, car sharing is a model of car rental where people rent vehicles for short periods of time, often by the hour. Many of the applications utilized by users to access car sharing, hereinafter referred to as car-sharing apps, use a map to show a prescribed pickup location of the vehicle. The prescribed pickup location may be set by an owner of the vehicle, or a previous renter of the vehicle. However, under certain circumstances, there is no guarantee that the vehicle will be found at the prescribed pickup location by a next renter, resulting in a "no-show" situation due to the vehicle owner's failure to park the vehicle at the prescribed pickup location, the previous renter's failure to return the vehicle to the prescribed location on time, or the like. Current solutions to guarantee that the vehicle will be found at the prescribed pickup location by the next renter include:

Providing the next renter with access to data indicative of the current vehicle location, such as a real-time map location of the vehicle, so the next renter may observe whether the vehicle is in the prescribed pickup location, en route to the prescribed pickup location, or otherwise located, Providing messages to the next renter with at least "one way-finding cue" for the next renter to locate the vehicle, or Contacting the owner of the vehicle owner for resolution first, and then contacting a service provider's support desk if the owner is unable to assist.

However, these current solutions only update the renter with the current vehicle location, but provide no intent to resolve the "no-show" situation. That is, the current solutions do not act proactively to mitigate the "no-show" situation.

The illustrative embodiments provide a vehicle location mechanism that introduces four states of location discrepancy and provides corresponding notifications and assistance to users of a car-sharing vehicle at different points in time, thereby mitigating a "no-show" situation. The four states of location discrepancy are determined by utilizing real-time Global Positioning System (GPS) data of vehicle's location and driving direction, in conjunction with the use of a plurality of gee-fences dynamically set using real-time inputs such as road, traffic, weather conditions, or the like. Utilizing this proactive and preventive approach of applying real-time data in detecting and determining a current state of location discrepancy provides real-time notifications and assistance to impacted parties.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be art implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular features or elements present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 1:
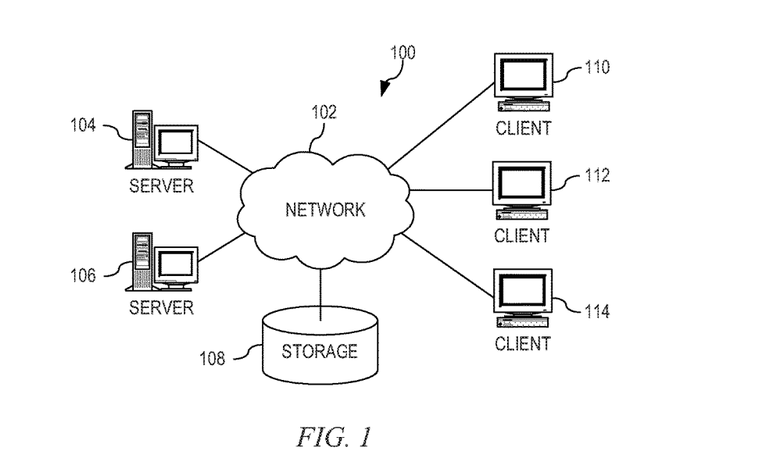
FIG. 1 is an example diagram of a distributed data processing system in which aspects of the illustrative embodiments may be implemented.
Figure 2:
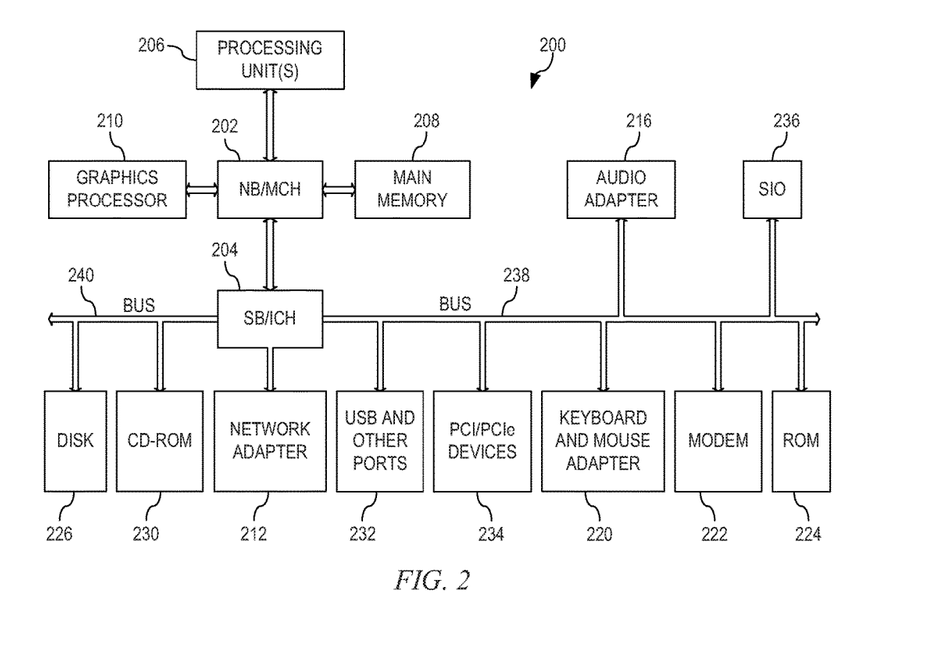
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement a vehicle location mechanism that introduces four states of location discrepancy and provides corresponding notifications and assistance to users of a car-sharing vehicle at different points in time. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates providing notifications and assistance to users of a car-sharing vehicle at different points in time using four states of location discrepancy.

As noted above, the mechanisms of the illustrative embodiments utilize specifically configured computing devices, or data processing systems, to perform the operations for providing notifications and assistance to users of a car-sharing vehicle at different points in time using four states of location discrepancy. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240, PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240, HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System P® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the a vehicle location mechanism that introduces four states of location discrepancy and provides corresponding notifications and assistance to users of a car-sharing vehicle at different points in time.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
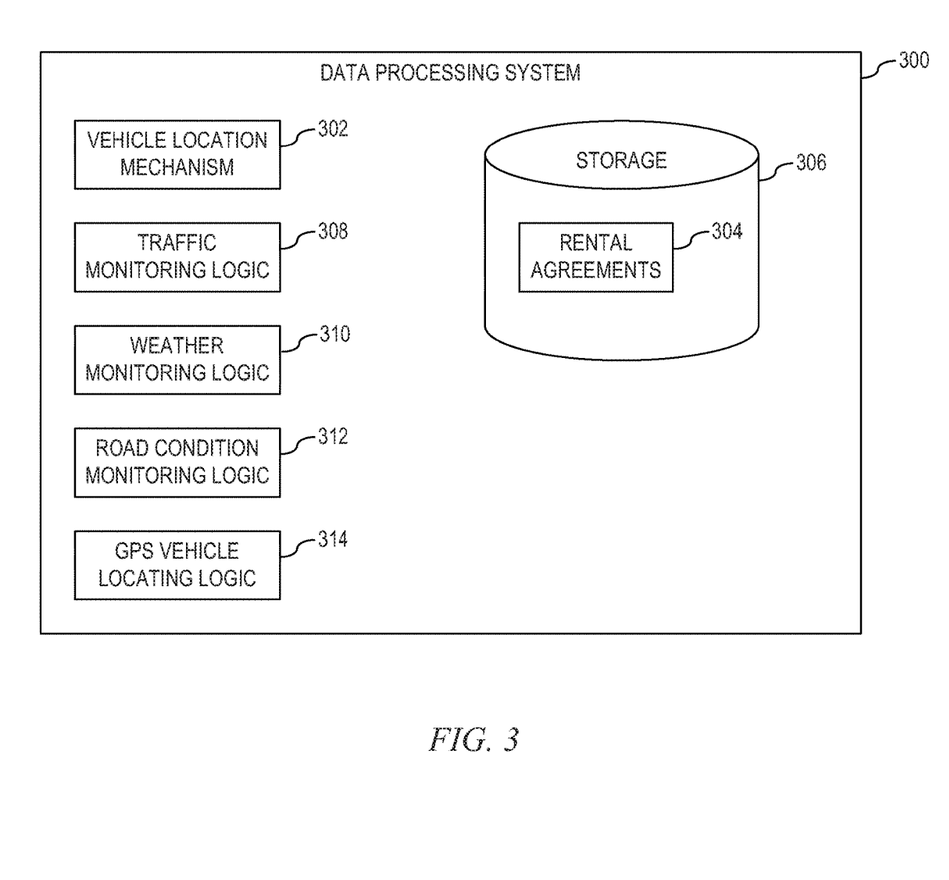
FIG. 3 depicts a functional block diagram of a vehicle location mechanism that provides corresponding notifications and assistance to users of a car-sharing vehicle at different points in time using four states of location discrepancy in accordance with an illustrative embodiment.

FIG. 3 depicts a functional block diagram of a vehicle location mechanism that provides corresponding notifications and assistance to users of a car-sharing vehicle at different points in time using four states of location discrepancy in accordance with an illustrative embodiment. In accordance with the illustrative embodiments, the four states of location discrepancy are safe, recoverable, non-recoverable, and ready, some of which provide corresponding notifications and assistance to impacted parties, such as the owner of the vehicle, the current renter of the vehicle, the next renter of the vehicle, or the like. In order to mitigate any "no-show" situations. The "Safe" state indicates that the current vehicle location is within a "safe zone" with respect to the prescribed pickup location for the next renter and no user notification is required. The "Recoverable" state indicates that the current vehicle location exceeds the "safe zone" but is still within recoverable boundaries. In the "recoverable" state, corresponding notifications are pushed to a current renter of the vehicle, the owner of the vehicle, or the like, to ensure the vehicle's return to the prescribed pickup location on time. The "Non-recoverable" state indicates that the current vehicle location exceeds the recoverable boundaries. The "Non-recoverable" state usually means that, the current renter has disregarded any previous warning notifications and that a delayed return or a "no-show" situation is inevitable. Finally, the "Ready" state indicates that the vehicle is returned and ready for pickup by the next renter. The parked vehicle location is within a predetermined proximity to the prescribed pickup location agreed upon by rental contact agreed to by the next renter of the vehicle.

To help determine each state of location discrepancy, vehicle location mechanism 302 within data processing system 300 generates a set of dynamic boundaries B0, B1, B2, B . . . , Bmin around a prescribed pickup location agreed upon with the next renter of the vehicle for a prescribed pickup time. In order to construct such boundaries B0, B1, B2, B . . . , Bmin, vehicle location mechanism 302 introduces an array of buffer times (TBn), where n=0, 1, 2, . . . , max. The values of buffer times TBn may be in an ascending order, with TB0=0 denoting no buffer time, i.e. the current renter needs to return to the prescribed pickup location for the next renter as soon as possible to meet the prescribed pickup time, and TBmax denoting a largest buffer time, i.e. the current renter has time before returning the vehicle to the prescribed pickup location for the next renter to meet the prescribed pickup time. Vehicle location mechanism 302 uses each of the buffer times TBn to calculate a set of displacements (D) for each of a set of possible travel directions from the prescribed pickup location. Vehicle location mechanism 302 then aggregates the set of displacements to form a single boundary around the prescribed pickup location for each respective buffer time TBn.

The displacement calculations performed by vehicle location mechanism 302 also depends on a time remaining (TR), denoting the time difference between a current time and the prescribed pickup time, and real-time inputs, such as road conditions, traffic conditions, weather conditions, or the like, for the roads within each of the boundaries. Vehicle location mechanism 302 may obtain the prescribed pickup time for the next renter from a set of rental agreements 304 stored in storage 306. Vehicle location mechanism 302 may obtain the traffic conditions for the various roads within each boundary from traffic monitoring logic 308 that identifies traffic conditions from various sources that report traffic conditions, such as departments of transportation, television stations, web sites, or the like. Vehicle location mechanism 302 may obtain the weather conditions for the various roads within each boundary from weather monitoring logic 310 that identifies weather conditions from various sources that report weather conditions, such as a weather service, television stations, websites, or the like. Finally, vehicle location mechanism 302 may obtain the road conditions for the various roads within each boundary from road condition monitoring logic 312 that identifies road conditions from various sources that report road conditions, such as departments of transportation, television stations, web sites, or the like. Fundamentally, vehicle location mechanism 302 calculates how far an average vehicle can travel in a specific direction from the prescribed pickup location within a given time interval (TR−TBn), taking into account the road conditions, traffic conditions, weather conditions, or the like, which are all factors in determining such a displacement.

Utilizing a speed of the vehicle (S), which may be an average speed of the vehicle, a current speed of the vehicle, speed limits associated with roads on which the vehicle is driving, or the like, in conjunction with each other or separately, as well as taking into account road conditions, traffic conditions, weather conditions, or the like, vehicle location mechanism 302 applies one or more analytics to calculate displacement (D) from the prescribed pickup location using the following equation:

$$D = (TR - TBn) * S.$$

Figure 4:
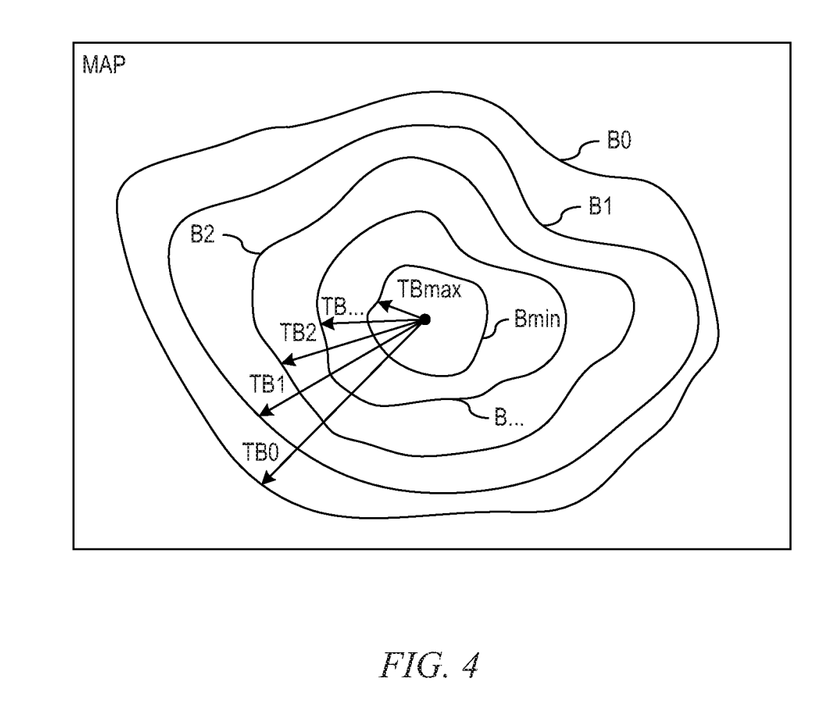
FIG. 4 depicts exemplary irregular boundaries formed for each of buffer times TB0, TB1, TB2, TB . . . , and TBmax in accordance with an illustrative embodiment.

Taking into consideration that different routes from the prescribed pickup location will impact the approximate travelling speed, for example different roads may have different speed limits, as well as other factors such as construction work, service repair, or the like, that impact the travel speed for a specific direction, vehicle location mechanism 302 generates a boundary formed by aggregating all the displacements for a given buffer time TBn that results in an irregular shape being formed around the prescribed pickup location rather than a circular shape. FIG. 4 depicts exemplary irregular boundaries formed for each of buffer times TB0, TB1, TB2, TB . . . , and TBmax in accordance with an illustrative embodiment. For buffer time TB0=0, the boundary (B0) formed by the corresponding displacements becomes the outermost boundary around the prescribed pickup location. Contrarily, for buffer time TBmax, denoting the largest buffer time the system defines, the boundary (Bmin) formed by the corresponding displacements becomes the closest boundary to the prescribed pickup location. It should be noted that the buffer time is an inverse to the boundary. That is, the largest boundary B0 has the smallest buffer time, i.e. TB=0, and the smallest boundary Bmin has the largest buffer time, i.e. TBmax.

Vehicle location mechanism 302 recalculates the boundaries at predefined intervals. That is, vehicle location mechanism 302 calculates the initial set of boundaries at the beginning of a rental period for the current renter, i.e. when the vehicle is driven away from the prescribed pickup location for the current renter. As time elapses, the value of (TR−TBn) becomes smaller, resulting in narrower boundaries to be formed for each of the buffer times TB0, TB1, TB2, TB . . . , and TBmax. Thus, at each predetermined interval, vehicle location mechanism 302 recalculates the dynamically generated boundaries and, based on the observed location of the vehicle and the boundary within which the vehicle is located, entering, exiting, or the like, vehicle location mechanism 302 identifies one of the four discrepancy states for the location for the vehicle. Vehicle location mechanism 302 obtains a current location of the vehicle utilizing global positioning position (GPS) vehicle locating logic 314.

Figure 5A:
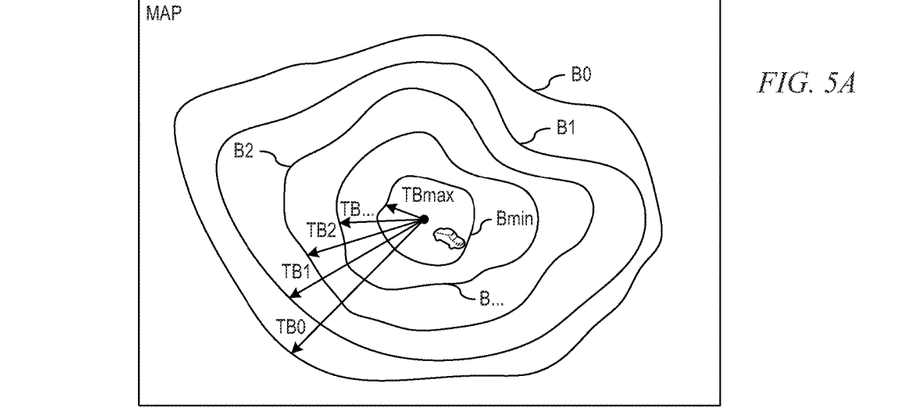
FIG. 5A depicts an example of the vehicle being in the "Safe" state in accordance with an illustrative embodiment.

Vehicle location mechanism 302 determines the vehicle to be in a "Safe" state when the current location of the vehicle is within the smallest boundary (Bmin) formed by using the largest buffer time (TBmax), i.e. a "safe zone", or when the target vehicle is entering the smallest boundary (Bmin). FIG. 5A depicts an example of the vehicle being in the "Safe" state in accordance with an illustrative embodiment. If the vehicle is determined to be in the "Safe" state, in one embodiment, vehicle location mechanism 302 may provide no notification at all to the owner of the vehicle, the current renter of the vehicle, and to the next renter of the vehicle. However, in another embodiment, each time vehicle location mechanism 302 recalculates the boundaries and the vehicle is determined to be in the "Safe" state, vehicle location mechanism 302 may provide a time remaining notification only to the current renter of the vehicle.

Figure 5B:
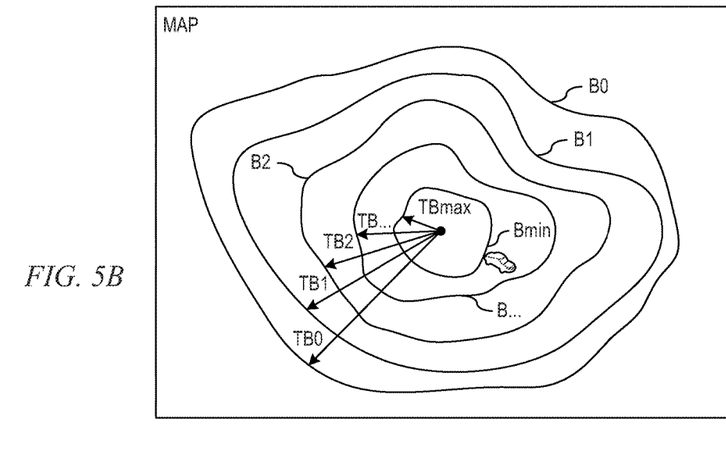
FIG. 5B depicts an example of the vehicle being in a low-severity "Recoverable" state in accordance with an illustrative embodiment.

Vehicle location mechanism 302 determines the vehicle to be in a "Recoverable" state when the vehicle is exiting Bmin or when the location of the vehicle is between boundaries Bmin and B0, i.e. in one of boundaries B1, B2, or Bmin. For the "Recoverable" state, vehicle location mechanism 302 utilizes a set of severities that are defined and determined to enable vehicle location mechanism 302 to programmatically trigger corresponding notifications and necessary assistance to one or more of the owners of the vehicle, the current renter of the vehicle, or to the next renter of the vehicle. Vehicle location mechanism 302 determines which severity from the set of severities depending on which boundary the vehicle is positioned within, entering, and or exiting. For example, when vehicle location mechanism 302 detects the vehicle is exiting the smallest boundary Bmin, vehicle location mechanism 302 may assign a "low" severity to the "Recoverable" state. FIG. 5B depicts an example of the vehicle being in a low-severity "Recoverable" state in accordance with an illustrative embodiment. Because the severity is low, vehicle location mechanism 302 may only send a notification to the current renter of the vehicle with information such as a return-time reminder.

Figure 5C:
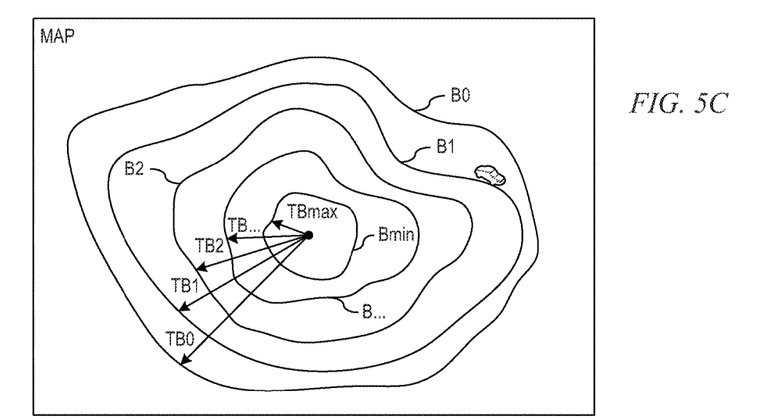
FIG. 5C depicts an example of the vehicle being in a high-severity "Recoverable" state in accordance with an illustrative embodiment.

As another example, when vehicle location mechanism 302 detects the vehicle as exiting boundary B1, i.e. the boundary formed by using the buffer time TB1, since this is the second largest boundary, vehicle location mechanism 302 may assign a "high" severity to the "Recoverable" state. FIG. 5C depicts an example of the vehicle being in a high-severity "Recoverable" state in accordance with an illustrative embodiment. Because the severity is high, on top of vehicle location mechanism 302 sending a notification to the current renter of the vehicle with information such as a return-time reminder, vehicle location mechanism 302 may also send a notification that indicates, based on one or more of the road conditions, traffic conditions, or weather conditions, an estimate of how long it will take to return to the prescribed pickup location, a route suggestion to the current renter of the vehicle, or the like.

Figure 5D:
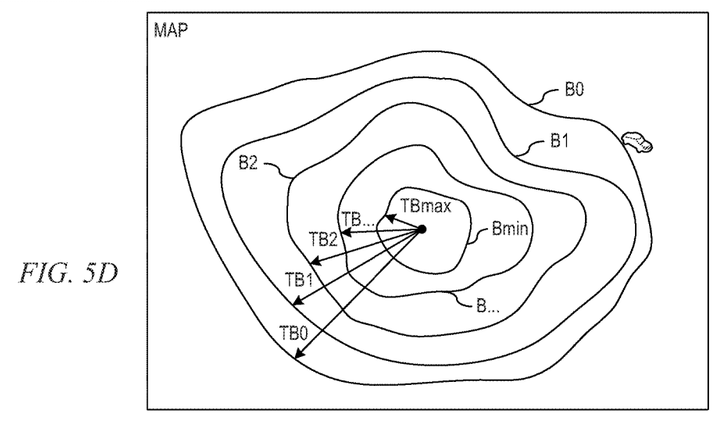
FIG. 5D depicts an example of the vehicle being outside the outermost boundary B0 and in a "Non-recoverable" state in accordance with an illustrative embodiment.

Vehicle location mechanism 302 determines the vehicle to be in the "Non-recoverable" state when the location of the vehicle is determined to be exiting the boundary defined by 130, i.e. the outermost boundary. FIG. 5D depicts an example of the vehicle being outside the outermost boundary B0 and in a "Non-recoverable" state in accordance with an illustrative embodiment. If the location of the vehicle is determined to be outside the boundary B0 and in the "Non-recoverable" state, vehicle location mechanism 302 notifies the owner of the vehicle, the current renter of the vehicle, and to the next renter of the vehicle of an inevitable "no-show" situation. Such a notification may allow the owner of the vehicle to provide another vehicle to the next renter, the owner of the vehicle imposing penalties to the current renter of the vehicle, or the like.

Finally, vehicle location mechanism 302 determines the vehicle to be in a "Ready" state when the vehicle is returned and ready for the pickup by the next renter. Vehicle location mechanism 302 determines that the vehicle is in the "Ready" state when the location of the vehicle as obtained from GPS vehicle locating logic 314 is within a predetermined proximity of the prescribed pickup location agreed upon by the rental contract for the next renter of the vehicle. If the location if the vehicle is determined to be within the predetermined proximity of the prescribed pickup location and thus in the "Ready" state, vehicle location mechanism 302 sends a notification to the next renter of the vehicle confirming the pickup status as well as, possibly, the GPS location of the vehicle location or a map indicating the location of the vehicle.

Therefore, vehicle location mechanism 302 calculates the dynamic boundaries at different points in time and provides notifications to one or more of the owners of the vehicle, the current renter of the vehicle, or to the next renter of the vehicle based on the "state" of the vehicle, i.e. the location of the vehicle based on the dynamic boundaries. That is, between Bmin and B0, there is a set of boundaries to be used to trigger corresponding notifications. Vehicle location mechanism 302 monitors the current vehicle location with respect to these dynamic boundaries and triggers one or more notifications based on the vehicle entering or exiting a related boundary. Additionally, the one or more notifications may be provided to a third party in relation to an activities, events, or the like, that require several parties to arrive at a same location at a predefined time. For example, a conference event is scheduled at a prescribed location for a specific time. The one or more notifications may provide advanced notifications and assistance to help event participants arrive on time and/or provide early detection of delay due, to a possible late-arrival of a key speaker and notify the event organizers and other participants of alternate arrangements, such as when the next renter will be delayed due to a current renter being in a "Non-recoverable" state.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 6:
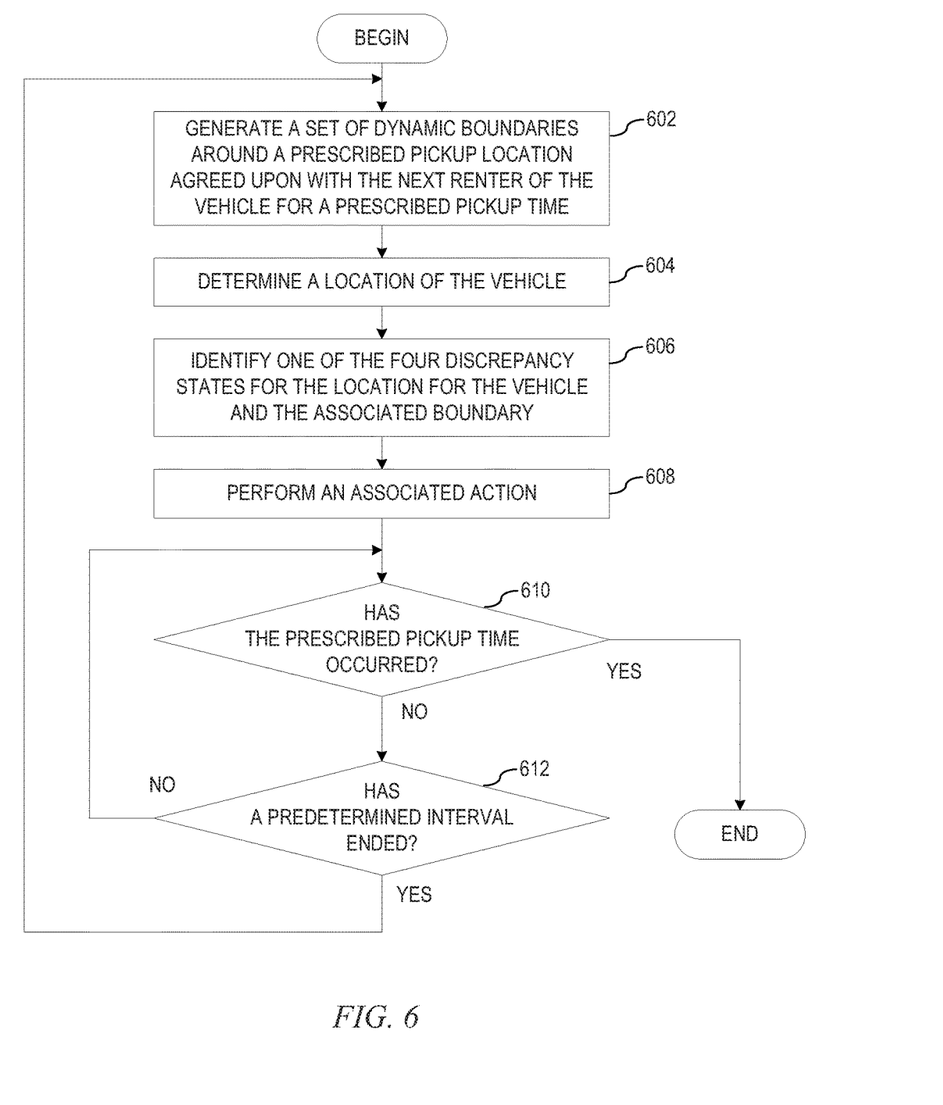
FIG. 6 depicts an exemplary flowchart of the operation performed by a vehicle location mechanism in detecting and mitigating vehicle location discrepancies in accordance with an illustrative embodiment.

FIG. 6 depicts an exemplary flowchart of the operation performed by a vehicle location mechanism in detecting and mitigating vehicle location discrepancies in accordance with an illustrative embodiment. As the operation begins, the vehicle location mechanism generates a set of dynamic boundaries B0, B1, B2, B . . . , Bmin around a prescribed pickup location agreed upon with the next renter of the vehicle for a prescribed pickup time (step 602). The vehicle location mechanism then determines a location of the vehicle (step 604) and determines a boundary with which the vehicle is located, entering, exiting, or the like. Based on the location of the vehicle and the boundary with which the vehicle is located, entering, exiting, or the like, the vehicle location mechanism identifies one of the four discrepancy states for the location for the vehicle and associated boundary (step 606). Based on the identified state, the vehicle location mechanism performs an associated action (step 608), with the operation ending thereafter.

The associated action include:

- If the vehicle is determined to be in a "Safe" state, the vehicle location mechanism provide no notification at all to the owner of the vehicle, the current renter of the vehicle, and to the next renter of the vehicle.
- If the vehicle is determined to be in a "Safe" state, the vehicle location mechanism provides a time remaining notification only to the current renter of the vehicle.
- If the vehicle is determined to be in a "Recoverable" state and a determined severity is low, the vehicle location mechanism sends a notification to the current renter of the vehicle with information such as a return-time reminder.
- If the vehicle is determined to be in a "Recoverable" state and a determined severity is high, the vehicle location mechanism sends a notification to the current renter of the vehicle with information such as a return-time reminder and/or a notification that indicates, based on one or more of the road conditions, traffic conditions, or weather conditions, an estimate of how long it will take to return to the prescribed pickup location, a route suggestion to the current renter of the vehicle, or the like.
- If the vehicle is determined to be in a "Non-recoverable" state, the vehicle location mechanism notifies the owner of the vehicle, the current renter of the vehicle, and to the next renter of the vehicle of an inevitable "no-show" situation.
- If the vehicle is determined to be in a "Ready" state, the vehicle location mechanism sends a notification to the next renter of the vehicle confirming the pickup status and, possibly, the GPS location of the vehicle location or a map indicating the location of the vehicle.

The vehicle location mechanism then determines whether the prescribed pickup time has occurred (step 610). If at step 610 the prescribed pickup time has not occurred, then the vehicle location mechanism determines whether a predetermined interval has ended (step 612). If at step 612 the interval has not ended, the operation returns to step 610. If at step 612 the interval has ended, the operation returns to step 602. If at step 610 the prescribed pickup time has occurred, the operation ends.

Figure 7:
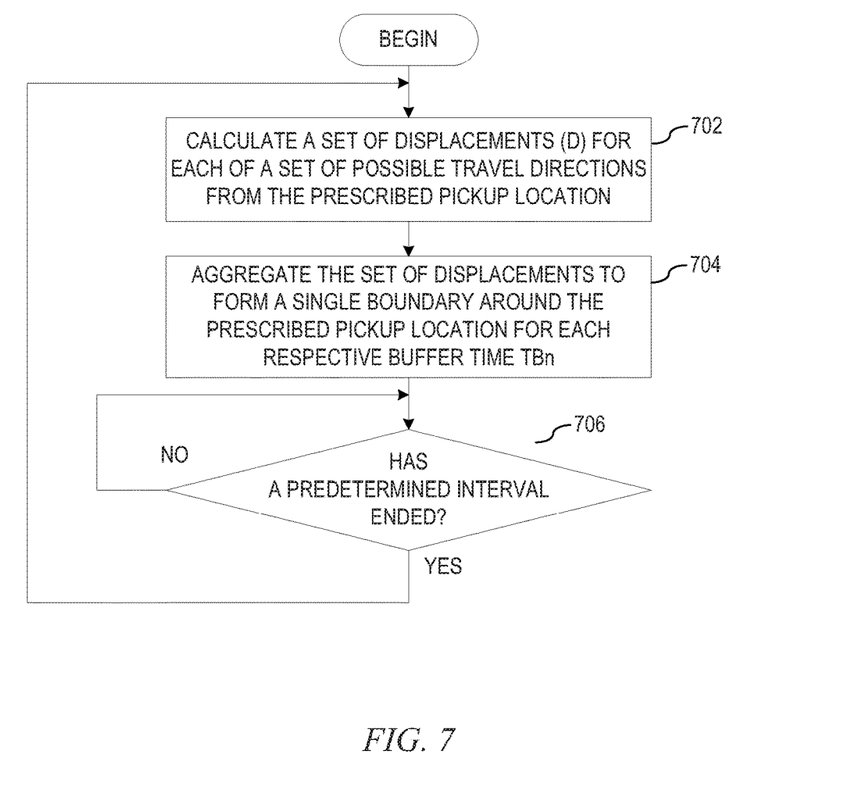
FIG. 7 depicts an exemplary flowchart of the operation performed by a vehicle location mechanism in generating a set of dynamic boundaries B0, B1, B2, B . . . , Bmin around a prescribed pickup location agreed upon with the next renter of the vehicle for a prescribed pickup time in accordance with an illustrative embodiment.

FIG. 7 depicts an exemplary flowchart of the operation performed by a vehicle location mechanism in generating a set of dynamic boundaries B0, B1, B2, B . . . , Bmin around a prescribed pickup location agreed upon with the next renter of the vehicle for a prescribed pickup time in accordance with an illustrative embodiment. As the operation begins, the vehicle location mechanism uses each of a set of buffer times TBn to calculate a set of displacements (D) for each of a set of possible travel directions from the prescribed pickup location (step 702). The displacement calculations performed by the vehicle location mechanism also depends on a time remaining (TR), denoting the time difference between a current time and the prescribed pickup time, and real-time inputs, such as road conditions, traffic conditions, weather conditions, or the like, for the roads within each of the boundaries. Fundamentally, the vehicle location mechanism calculates how far an average vehicle can travel in a specific direction from the prescribed pickup location within a given time interval (TR−TBn), taking into account the road conditions, traffic conditions, weather conditions, or the like, which are all factors in determining such a displacement. Utilizing a speed of the vehicle (S), which may be an average speed of the vehicle, a current speed of the vehicle, speed limits associated with roads on which the vehicle is driving, or the like, in conjunction with each other or separately, as well as taking into account road conditions, traffic conditions, weather conditions, or the like, the vehicle location mechanism applies one or more analytics to calculate displacement (D) from the prescribed pickup location using the following equation:

$$D = (TR - TBn) * S.$$

The vehicle location mechanism aggregates the set of displacements to form a single boundary around the prescribed pickup location for each respective buffer time TBn (step 704). Taking into consideration that different routes from the prescribed pickup location will impact the approximate travelling speed, for example different roads may have different speed limits, as well as other factors such as construction work, service repair, or the like, that impact the travel speed for a specific direction, for each of the buffer times TB0, TB1, TB2, TB . . . , and TBmax, the vehicle location mechanism generates a boundary formed by aggregating all the displacements for a given buffer time TBn that results in an irregular shape being formed around the prescribed pickup location rather than a circular shape. The vehicle location mechanism then determines whether a predetermined interval has ended (step 706). If at step 706 the interval has not ended, the operation returns to step 706. If at step 706 the interval has ended, the operation returns to step 702. Thus, at each predetermined interval, the vehicle location mechanism recalculates the dynamically generated boundaries.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for detecting and mitigating vehicle location discrepancies. Based on the determination of the location discrepancy state using real-time data and dynamic boundaries, the illustrative embodiments providing time-based notifications and assistance to impacted parties including staged notifications and assistance to allow users to take proactive and preventive actions in avoiding or mitigating the "no-show" situations, accurate and timely insights to users through aggregation of real-time data and analytics, and early detection of inevitable "no-show" situations.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art, to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory coupled to the processor, for detecting and mitigating vehicle location discrepancies, the method comprising:
    generating, by the processor, a set of dynamic boundaries around a prescribed pickup location agreed upon with a next renter of a vehicle for a prescribed pickup time;
    determining, by the processor, a location of the vehicle;
    based on the location of the vehicle, determining, by the processor, a boundary in the set of dynamic boundaries with which the vehicle is associated;
    identifying, by the processor, one state from a set of states based on the location of the vehicle and the identified boundary with which the vehicle is located;
    based on the identified state, perform, by the processor, an associated action; and
    repeating, by the processor, the generating of the set of dynamic boundaries, determining the location of the vehicle, determining the boundary in the set of dynamic boundaries with which the vehicle is associated, identifying the one state from a set of states, and performing the associated action at predetermined intervals until the vehicle is either in a "Ready" state or is in a "No-show" situation.

2. The method of claim 1, wherein the set of dynamic boundaries around the prescribed pickup location agreed upon with the next renter of the vehicle for the prescribed pickup time is generated by the method comprising:
    for each buffer time in a set of buffer times (TBn):
    calculating, by the processor, a set of displacements for each of a set of possible travel directions from the prescribed pickup location; and
    aggregating, by the processor, the set of displacements for the respective buffer time to form a single boundary around the prescribed pickup location.

3. The method of claim 2, wherein calculating each displacement in the set of displacements, comprises:
    determining, by the processor, a time remaining (TR) denoting the time difference between a current time and the prescribed pickup time
    determining, by the processor, a speed (S) at which the vehicle can travel based on one or more of an average speed of the vehicle, a current speed of the vehicle, speed limits associated with roads on which the vehicle is driving, road conditions, traffic conditions, or weather conditions; and
    calculating, by the processor, the displacement using the following formula:

$$D=(TR-TBn)*S.$$

4. The method of claim 1, wherein the set of states includes a "Safe" state, a "Recoverable" state, a "Non-recoverable" state, and the "Ready" state.

5. The method of claim 4, wherein the state is the "Safe" state and the associated action is either to provide no notification at all to an owner of the vehicle, a current renter of the vehicle, and to a next renter of the vehicle, or the provide a return-time reminder to the current renter of the vehicle.

6. The method of claim 4, wherein the state is the "Recoverable" state and the associated action is one or more of sending a return-time reminder to the current renter of the vehicle; sending a notification that indicates, based on one or more of an average speed of the vehicle, a current speed of the vehicle, speed limits associated with roads on which the vehicle is driving, road conditions, traffic conditions, or weather conditions, an estimate of how long it will take to return to the prescribed pickup location to the current renter of the vehicle; or a route suggestion to the current renter of the vehicle.

7. The method of claim 4, wherein the state is the "Non-recoverable" state and the associated action is one or more of notifying an owner of the vehicle, a current renter of the vehicle, and to a next renter of the vehicle of the inevitable "no-show" situation.

8. The method of claim 4, wherein the state is the "Ready" state and the associated action is one or more of sending a notification to a next renter of the vehicle confirming a pickup status, a location of the vehicle location, or a map indicating a location of the vehicle.

9. The method of claim 4, wherein the associated action is to provide a third party with advanced notification or assistance indicating a status of the current renter based on the identified state.

10. A computer program product comprising a non-transitory computer readable storage medium having a computer readable program stored therein, wherein the computer readable program, when executed on a computing device, causes the computing device to:
generate a set of dynamic boundaries around a prescribed pickup location agreed upon with a next renter of a vehicle for a prescribed pickup time;
determine a location of the vehicle;
based on the location of the vehicle, determine a boundary in the set of dynamic boundaries with which the vehicle is associated;
identify one state from a set of states based on the location of the vehicle and the identified boundary with which the vehicle is located;
based on the identified state, perform an associated action; and
repeat the generating of the set of dynamic boundaries, determining the location of the vehicle, determining the boundary in the set of dynamic boundaries with which the vehicle is associated, identifying the one state from a set of states, and performing the associated action computer readable program at predetermined intervals until the vehicle is either in a "Ready" state or is in a "No-show" situation.

11. The computer program product of claim 10, wherein the set of dynamic boundaries around the prescribed pickup location agreed upon with the next renter of the vehicle for the prescribed pickup time is generated by the computer readable program further causing the computing device to:
for each buffer time in a set of buffer times (TBn):
calculate a set of displacements for each of a set of possible travel directions from the prescribed pickup location; and
aggregate the set of displacements for the respective buffer time to form a single boundary around the prescribed pickup location.

12. The computer program product of claim 11, wherein the computer readable program to calculate each displacement in the set of displacements causes the computing device to:
determine a time remaining (TR) denoting the time difference between a current time and the prescribed pickup time
determine a speed (S) at which the vehicle can travel based on one or more of an average speed of the vehicle, a current speed of the vehicle, speed limits associated with roads on which the vehicle is driving, road conditions, traffic conditions, or weather conditions; and
calculate the displacement using the following formula:

$$D=(TR-TBn)*S.$$

13. The computer program product of claim 10, wherein the set of states includes a "Safe" state, a "Recoverable" state, a "Non-recoverable" state, and the "Ready" state.

14. An apparatus comprising:
a processor; and
a memory coupled to the processor, wherein the memory comprises instructions which, when executed by the processor, cause the processor to:
generate a set of dynamic boundaries around a prescribed pickup location agreed upon with a next renter of a vehicle for a prescribed pickup time;
determine a location of the vehicle;
based on the location of the vehicle, determine a boundary in the set of dynamic boundaries with which the vehicle is associated;
identify one state from a set of states based on the location of the vehicle and the identified boundary with which the vehicle is located;
based on the identified state, perform an associated action; and
repeat the generating of the set of dynamic boundaries, determining the location of the vehicle, determining the boundary in the set of dynamic boundaries with which the vehicle is associated, identifying the one state from a set of states, and performing the associated action instructions at predetermined intervals until the vehicle is either in a "Ready" state or is in a "No-show" situation.

15. The apparatus of claim 14, wherein the set of dynamic boundaries around the prescribed pickup location agreed upon with the next renter of the vehicle for the prescribed pickup time is generated by the instructions further causing the processor to:
for each buffer time in a set of buffer times (TBn):
calculate a set of displacements for each of a set of possible travel directions from the prescribed pickup location; and
aggregate the set of displacements for the respective buffer time to form a single boundary around the prescribed pickup location.

16. The apparatus of claim 15, wherein the instructions to calculate each displacement in the set of displacements cause the processor to:
determine a time remaining (TR) denoting the time difference between a current time and the prescribed pickup time
determine a speed (S) at which the vehicle can travel based on one or more of an average speed of the vehicle, a current speed of the vehicle, speed limits associated with roads on which the vehicle is driving, road conditions, traffic conditions, or weather conditions; and
calculate the displacement using the following formula:

$$D=(TR-TBn)*S.$$

17. The apparatus of claim 14, wherein the set of states includes a "Safe" state, a "Recoverable" state, a "Non-recoverable" state, and the "Ready" state.

* * * * *